United States Patent
Jones et al.

(10) Patent No.: US 6,381,599 B1
(45) Date of Patent: *Apr. 30, 2002

(54) SEAMLESS INTEGRATION OF INTERNET RESOURCES

(75) Inventors: David R. Jones; Gregory S. Gerard, both of Columbus; Julie H. Hanley, Middletown, all of OH (US)

(73) Assignee: America Online, Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/439,678

(22) Filed: Nov. 15, 1999

Related U.S. Application Data

(63) Continuation of application No. 08/967,431, filed on Nov. 10, 1997, now Pat. No. 6,026,429, which is a continuation of application No. 08/476,711, filed on Jun. 7, 1995, now abandoned.

(51) Int. Cl.$^7$ .............................................. G06F 17/30
(52) U.S. Cl. .............................. 707/5; 707/10; 709/223; 709/224; 709/217
(58) Field of Search ............................ 707/1, 10, 2–6, 707/104, 500; 709/217, 218, 219, 203; 705/51

(56) References Cited

U.S. PATENT DOCUMENTS

| | | | | |
|---|---|---|---|---|
| 5,442,771 A | * | 8/1995 | Filepp et al. | 709/219 |
| 5,530,852 A | * | 6/1996 | Meske et al. | 709/206 |
| 5,590,321 A | * | 12/1996 | Lin et al. | 707/10 |
| 5,608,900 A | * | 3/1997 | Dockter et al. | 707/102 |
| 5,740,421 A | * | 4/1998 | Palmon | 707/4 |
| 6,026,429 A | * | 2/2000 | Jones et al. | 709/201 |

OTHER PUBLICATIONS

Research Libraries Group, Access To UMI/Data Courier Database on RLIN, 1992, Information Today.*

* cited by examiner

*Primary Examiner*—John Breene
*Assistant Examiner*—Debbie M Le
(74) *Attorney, Agent, or Firm*—Standley & Gilcrest LLP

(57) ABSTRACT

A mechanism for seamlessly searching and accessing information available through the Internet and other resources is disclosed. The present invention maintains a database of file objects available from numerous sources. The present invention updates the database periodically to ensure the accuracy and completeness of it. The present invention also may access and retrieve data from numerous sources when prompted by a single and simple command initiated by the user. The user is shielded from the quirks and intricacies of various information sources.

20 Claims, 4 Drawing Sheets

SEAMLESS INTEGRATION OF INTERNET RESOURCES

This application is a continuation of U.S. patent application Ser. No. 08/967,431 filed Nov. 10, 1997 entitled SEAMLESS INTEGRATION OF INTERNET RESOURCES, now U.S. Pat. No. 6,026,429, which was a file wrapper continuation of U.S. patent application Ser. No. 08/476,711 filed Jun. 7, 1995, now abandoned.

BACKGROUND AND SUMMARY OF THE INVENTION

The present invention relates generally to a system for use in on-line research, and more particularly, to a computer system that enables a user to have access to information available via the Internet and other resources in an environment which provides seamless integration of all such information.

The Internet is a connection of many individual campus, state, regional and national computer networks into one single logical network all sharing a common addressing scheme. Most of these networks have publicly accessible information. This information includes electronic journals, mailing lists, electronic books, programs, pictures, encyclopedias and dictionaries and many other resources such as articles and legislative databases just to name a few. Some databases exist solely to archive academic information exchange. These databases and networks house a great deal of information that can be of great benefit to those that have the ability to access it. However, a lack of an easy way to access information has been a bottleneck that has prevented people from utilizing the information.

Users of commercial dial-up services are accustomed to one-stop shopping. These users generally sign on to the service and, through the use of navigation aids, search and retrieve relevant information. These commercial services have navigation aids or programs dedicated to providing easy access to information. These searches, however, are limited to the centralized computer databases of that commercial service or to databases that are connected directly to that service. If the user wants to access information available via the Internet, the user must enter an area that allows access to the Internet via a specialized gateway. These gateways generally require the user to utilize protocols of the Internet, such as FTP, Telnet and USENET, which provide only very basic functions through a cryptic command format. These functions may include electronic mail, file transfer and remote login. Electronic mail allows people to send messages to one or more people, to deliver text files, to retrieve information by automated computer programs like LISTSERV (through a gateway to BITNET), and more. File transfer may occur through a process called file transfer protocol, or FTP. This process allows one to log on to remote computers and use the resources in directories that network administrators have made available to the public to access publicly available documents or programs. Remote login or Telnet, provides the ability to connect to a remote computer and work with it interactively. Through Telnet, one can log into directories of remote computers, such as library catalogs of distant universities, and search for relevant information. During a Telnet session the user's computer serves as a terminal of that remote computer. Each of these programs provide minimal access to focused resources and can be confusing to the user. Moreover, to implement a complete search of information the user must master each method and individually search each service.

The connections provided by Internet access providers generally give few indications to the user about what to do to access information. Most users, log on through a UNIX-based service provider and work with a cryptic prompt. Generally, users see a set of application programs that enable one to use the network. Some of these programs boast the ability to provide easy access to the greatest number of resources, but none provide a method of incorporating all available search programs or resources into one universal resource access system.

The Internet provides the ability to access mailing lists. Mailing lists are subscriber listings of publicly available discussions by people who share common interests. A mailing list is an e-mail address that redistributes all mail sent to it back out to a list of addresses. As an example, those people interested in general information about a subject area may access the mailing list and subscribe to that list that posts messages concerning that subject area. In the future, postings to that list will be sent to that and all other subscribers. The user may then, at his leisure, read all or some of those postings. The user may even reply to a posting by sending a message to all subscribers or to the specific author of the posting. Each mailing list is focused upon a specific hobby or interest area and provides the user with the ability to easily keep up-to-date on a chosen topic.

Similar to mailing lists, the Internet provides USENET. The USENET is a worldwide network of newsgroups on thousands of subjects which can be accessed by newsreader programs. For commercial dial-up users, USENET newsgroups seem familiar in many ways. They are discussion areas where ideas can be exchanged. A user can post a message on-line and read the responses to it that build up over time. A user can subscribe to a particular newsgroup, page through it using a software reader, organize the messages according to threads, add messages commenting on what people have said, and ask questions.

The Internet provides a program called FTP, or File Transfer Protocol. FTP is a way of sending files between computers. FTP provides interactive capabilities that allow the user to log on to a remote computer and prowl around in its directories to locate a file and have it sent. The process is slow and complex. Unlike commercial services such as CompuServe®, there are few menus to guide the user, and even at the largest archival sites, software can be challenging to locate by type or description. Also unlike commercial services, FTP sites have other purposes for existing. They are working systems that have resources that are not designed for access by the general public and are not "user-friendly." FTP sites do not have easy-to-use interfaces similar to the CompuServe Information Manager®. There is another difference between commercial on-line service libraries and the FTP sites of the Internet. CompuServe's Forums® are run by system operators. The system operator keeps a close check on the files uploaded to libraries, to make sure they contain no viruses, to ensure that they work, and to determine that they're worthwhile. They also make sure that the available programs are current versions. Software at FTP sites, on the other hand, may or may not receive this kind of scrutiny.

To improve and simplify access to these files available via FTP an indexing tool called Archie was developed. Archie servers store information on what is available at FTP sites in regularly updated servers. A user can Telnet to an Archie server and search the database. Archie allows searching for entries containing a particular search string, and it can provide other information which can be useful in the search for specific files. Archie also maintains a software description database that holds the names and descriptions of software packages. To obtain the located resource, however, a user must leave Telnet and must set up a FTP session to get the file.

There are other search tools available to the Internet user. These tools include programs called Gopher, WAIS, World Wide Web, Veronica, etc. These programs attempt to address the problem of having a multitude of databases, with multiple redundant files of several versions located around the world. However, even with these tools, a user attempting to locate and download required information has been described as being faced with a task similar to a person trying to find a bathroom in a house with 250,000 unmarked doors. The user will eventually find that file but will be required to spend considerable amounts of time and will be required to have an inordinant amount of patience and persistence.

Gopher allows a user to browse the Internets resources in many forms. Gopher provides a menu of available options and allows the user to access several different services or programs. There are several ways of accessing a gopher server, such as a local client program or via a Telnet session. Gopher clients also provide the ability to search for specified terms. Gopher utilizes Archie to locate files via FTP and is therefore subject to Archie's limitations. Gopher provides abundant materials to search but does not provide an easy method of accessing all materials from one screen.

Another program has been created in an attempt at solving this problem. Veronica provides a keyword search of the titles of Gopher items. Unlike Archie, Veronica provides the ability to directly access and obtain desired files without transferring into FTP.

The Internet offers Wide Area Information Servers, or WAIS, for on-line text searching. A user is permitted to search for a combination of keywords by sending search strings to the appropriate WAIS servers. WAIS locates documents that contain the specified keywords and information is returned in hierarchical order based on frequency of each keyword and the distance between keywords within each document. WAIS is based on the client/server model and allows the user's computer to mimic a client and access the server where the data is stored. WAIS allows the ability to specify multiple databases to be searched sequentially.

The World Wide Web, or WWW, is a hypertext project that links key concepts and thus allows a user to browse resources available on the Internet. WWW is similar to WAIS but utilizes a hypertext system to link documents together. Some WWW browsers use a graphical interface but some utilize a textual interface. In general, users may access a WWW client, select a number that instructs the client to access the document corresponding to the number. In a graphical interface users may simply point and click to move from document to document.

The present invention may provide a means for searching all resources on the Internet with one search command. The present invention may maintain a database of references available from numerous sources on the Internet and provides a method for acquiring those resources. The present invention may update the database periodically to ensure the accuracy and completeness of it. The present invention may have the ability to search through databases constructed using the tools described above either simultaneously or selectively. The present invention may have a modular structure to it that allows for new Internet search and access tools to be added or removed as it is deemed proper. The present invention may provide "one-stop" shopping for researchers that shields users from the intricacies of accessing, searching and retrieving information through numerous methods. Utilizing the present invention the user may, with a single search, acquire a list of all available resources on a desired topic. The user may then access the information directly through a seamless interface that shields the user from the quirks of various Internet systems.

The present invention may utilize an interactive front-end which serves to obtain the user's request along with pertinent filtering or search limiting stipulations. The interactive front-end may then access a search engine to perform the search and then may display the results received from the search engine.

Preferably, the search engine of the present invention performs the information search. It may perform this search by searching a local information repository consisting of database objects representing information from various sources, such as FTP sites and CIS Forums®. The search engine preferably has the ability to reformat the search request in order to invoke other helper tasks such as a local or remote file finder.

The present invention may utilize an information repository that contains information concerning location. Preferably, the information repository consists of a set of relational database tables defining information source objects. Each object may contain a class, keyword, description, location and other similar data for use in both locating the object in a search and for accessing it if it is selected. Additionally, the information repository may contain subjective evaluations of the quality of information. Preferably, the information repository serves as an intermediate database that will allow a search of information available via the Internet and other sources while not requiring individual searches on the Internet for each access of the information repository. This conserves Internet resources by minimizing the number of accesses by those searching for information. The information repository may be updated periodically and at times when the activity on the Internet is low.

The information repository may be updated by several different update mechanisms. There may be an update mechanism for each source of information which feeds the information repository. For example, general Internet information may be provided via suppliers independent of the entity maintaining the information repository such as the Internet Yellow Pages®. Additional information may come from local forums or system operators. Mall information may also be provided by product managers or perhaps by merchants. Some mechanisms may be interactive while others might run as background jobs pulling information from remote Internet sites. Each individual mechanism is preferably responsible for converting the information from its raw source into the format required by the information repository.

A library of routines may also be provided to add, delete and maintain entries within the information repository.

In general, the present invention provides the ability to search and access information across the Internet and other sources with one search request. Thereby obviating the need to search using several separate search programs and accessing several different databases. The present invention also provides seamless integration of all Internet resources. The user of the present invention need not know where the information is located or how it was accessed.

These and other advantages will be apparent from the following detailed description of the invention, drawings, and claims.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION OF PREFERRED EMBODIMENT(S)

Figure 1A:
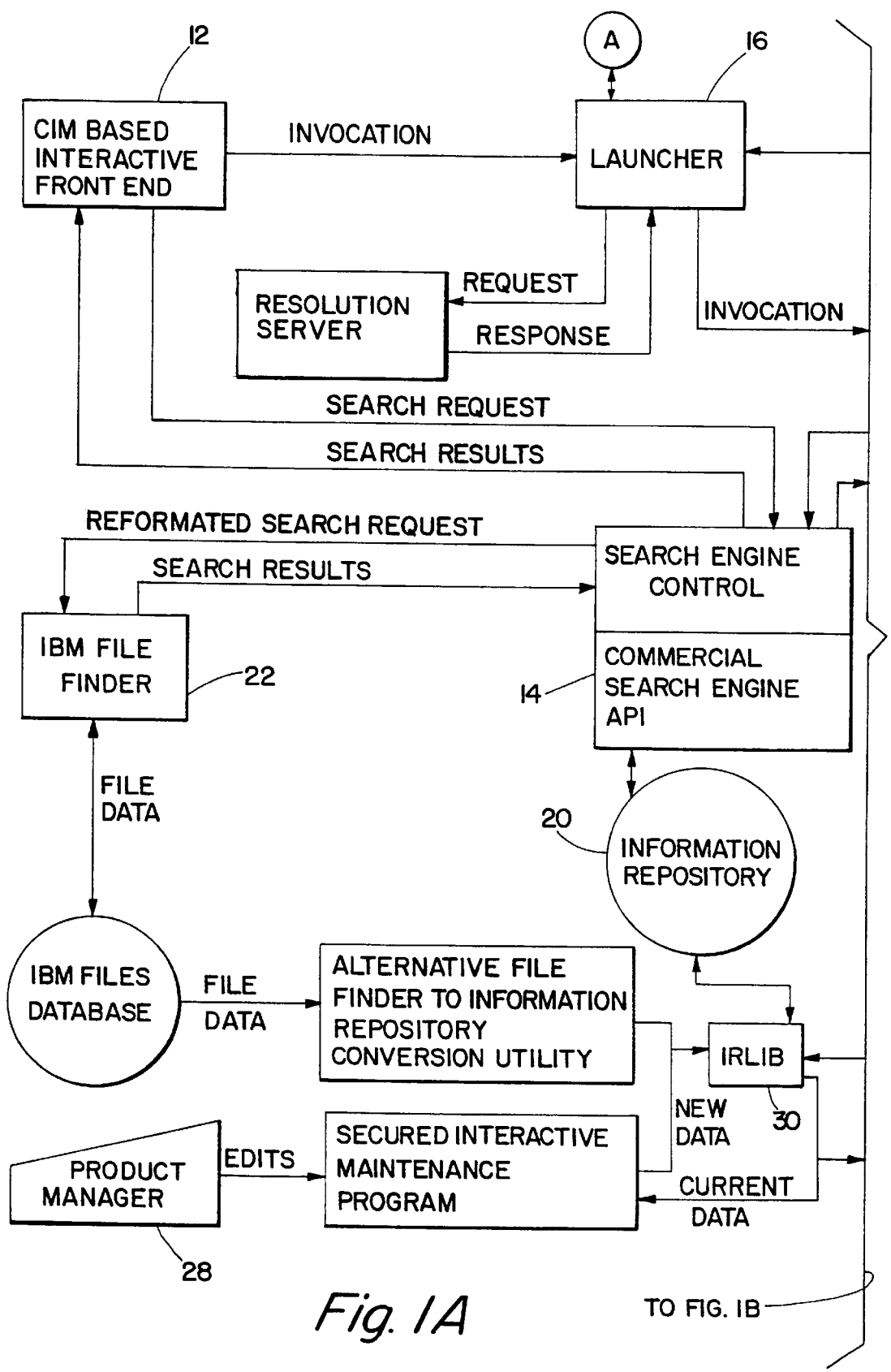
FIG. 1 is a schematic chart showing a first section of one embodiment of the present invention.
Figure 1B:
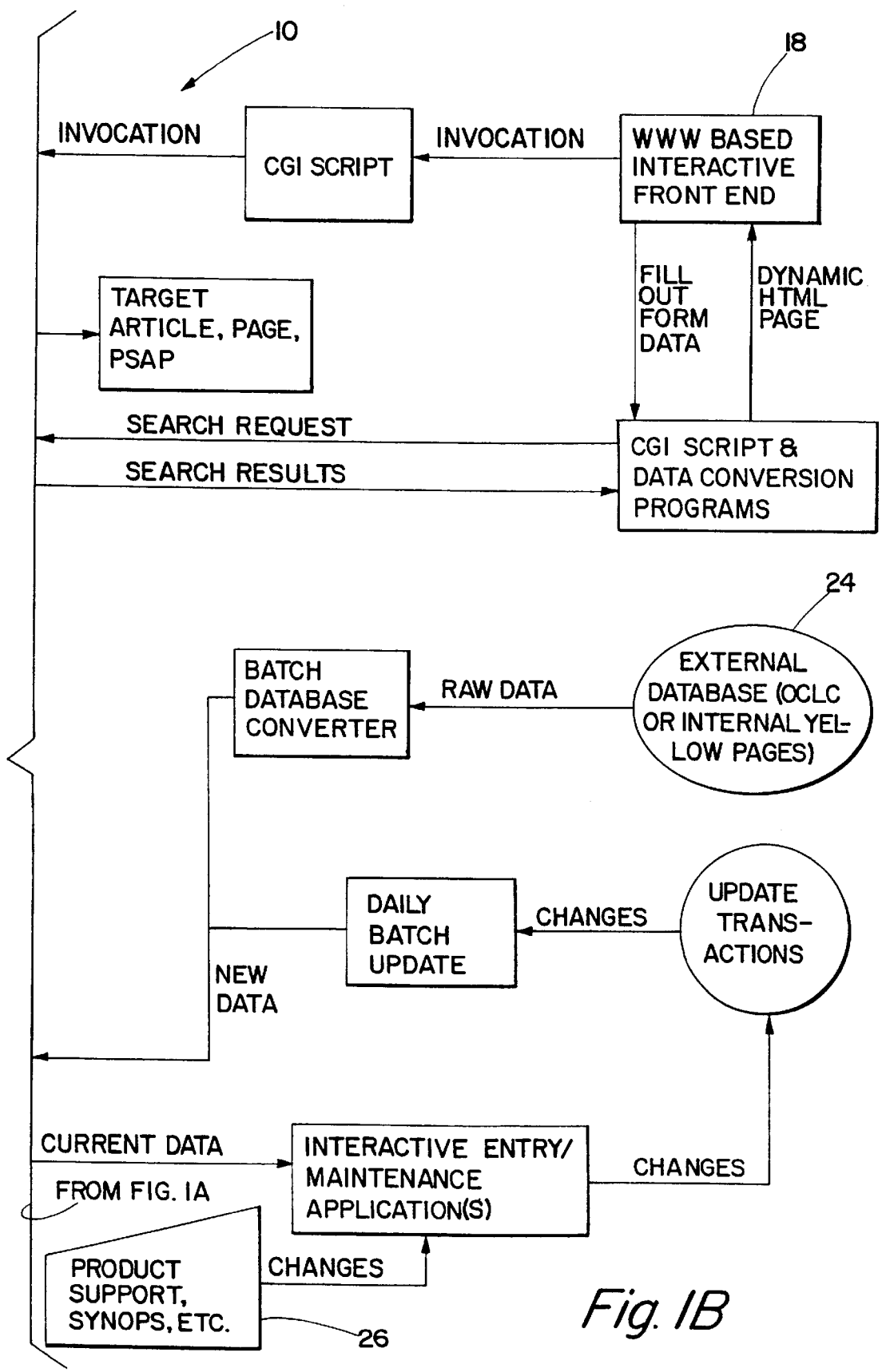
Figure 2:
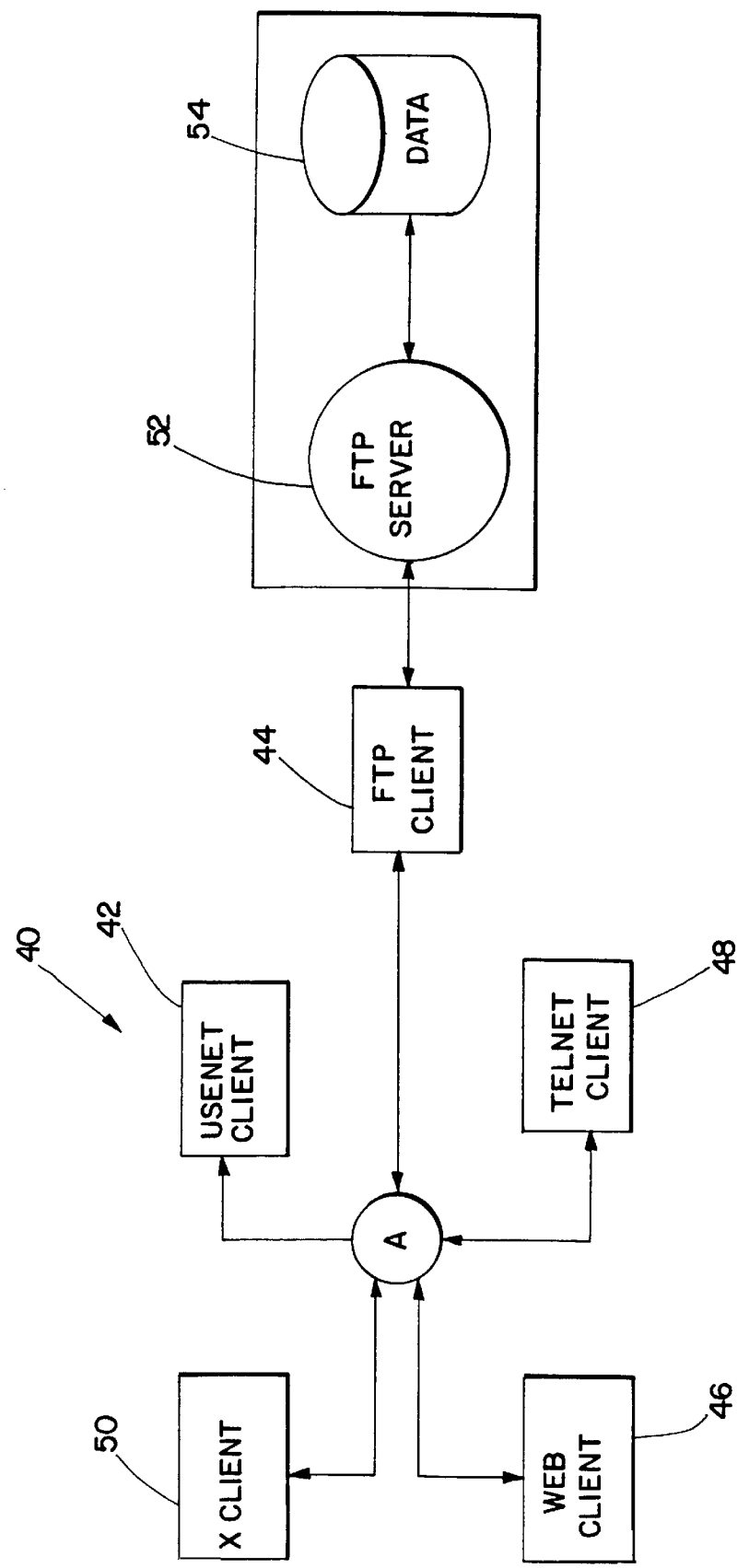
FIG. 2 is a schematic chart of the second section of the embodiment of FIG. 1.

Referring to FIG. 1, a schematic diagram of a preferred embodiment of the present invention 10 is shown. An interactive front end 12 is utilized to obtain the user's request along with pertinent filtering and/or limiting stipulations. The interactive front end may invoke the search engine 14 and display the results returned by the search engine. The interactive front end may also invoke a launcher 16 to launch the appropriate applications to access any item selected by the user from the search results. The present invention may separate these functions from the search engine to allow more than one front end to be utilized. A web browser front end 18 may be provided for users accessing the present invention directly from the Internet rather than through a dedicated interactive front end.

The interactive front end 12 may provide simple keyword searching using one, two or three keywords combined using either OR or AND logic. The user may have the option to call up a dialog to determine what parts of the dataspace are to be included in the search. The user may search any combination of data sources such as local files, forums or Internet resources through the Web, UseNet news groups, FTP or Telnet sites to name a few. For instance, a user that is interested in stereos might like to know which stores in an electronic mall sell stereos and which Forum message are as pertain to stereos but might not care about Forum files sections that deal with stereos. On the other hand, a user researching a term paper probably would not care to search the electronic mall. The interactive front end 12 may be designed to store each user's individual preferred set of default resources to search.

The user may also be provided the ability to set limits on how extensive or how long the search will operate. The user may be allowed to set a maximum time on the search and a maximum number of items to retrieve. As the information repository 20 grows and more and more object sources are included and as more helper tasks are added to the search engine 14 the time required to perform a complete search may become quite lengthy. The ability to query information provider databases can significantly add to this problem. To prevent such long searches, the user may be provided the option of limiting the time for the search.

Once the information is retrieved from the information repository 20 via the search engine 14 the results may be displayed to the user who may then be provided the opportunity to select an item and either access it directly, narrow the search by returning to the search selection dialog, or obtain a more detailed description of the item. The detailed description may be displayed in a text box to allow local printing. Any related objects within the database may be indicated to the user to provide the option of also accessing them.

Preferably, the interactive front end is configured to determine which application to invoke based on the class, sub-class and universal resource locator information retrieved as part of the search results. By isolating this function from the information repository database it becomes possible for the same object to be accessed by totally different interfaces which invoke different applications to access the object. Preferably, the information repository is responsible for identifying what the object is and it is the job of the interactive front end to determine the best method of accessing the object or to call upon another application to make that decision.

The search engine 14 may be utilized to perform the actual search of the information. The search engine may accomplish this task by searching its own local information repository 20 that consists of a database of objects representing information sources ranging from FTP sites to local Forums. The search engine 14 may also have the ability to reformat the search request in order to invoke helper tasks such as a file finder 22. The search engine may also have the ability to call helper conversion tasks to extract pertinent information from existing databases on a batch basis to load this information into the information repository database 20. The present invention may be initially implemented with only a local repository and a single helper task and the ability to access additional helper tasks could be added as the product grows and matures.

The information repository 20 may consist of a set of relational database tables defining information source objects. The information repository 20 for each object may contain a class, keywords, description, location and other similar data for use both in locating the object in a search and for accessing it if it is selected. Preferably, the information may contain a subjective evaluation of the quality of information available in each particular object. The information repository will serve to combine information gathered from a number of sources.

The present invention preferably has several update mechanisms available. There may be one update mechanism for each source of information that feeds the information repository. For example, general Internet information may be supplied by an outside supplier such as O.C.L.C. or the Internet Yellow Pages® 24. Information may be supplied by forums or by system operators 26. Mall information may be provided by product managers 28 or by merchants. Some update mechanisms might be interactive while others might run as background jobs pulling information from remote Internet sites. Preferably, each mechanism is responsible for converting the information from its raw source into the format required by the information repository. A library of routines 30 may also be provided to add, delete and maintain entries within the information repository.

Once a search has been performed the user may be provided with a list of data sources that meet the requirements of the search. The present invention allows the user to seamlessly access the source and retrieve the data merely by choosing the data the user desires and by invoking a simple retrieve command. Each data source listing has location and retrieval information associated with it. If a user invokes a retrieve command the launcher 16 may then access any of several clients shown generally at 40. The launcher 16 may access a USENET client 42, an FTP client 44, a WEB client 46, a TELNET client 48 as well as any other appropriate client 50. As an example, launcher 16 may access an FTP client 44 which in turn accesses an FTP Server 52 which may retrieve the data file from a database 54. Through use of the present invention the user need not be required and preferably may not even realize that the data file originated from a source remote from the dial-up service through the Internet.

Figure 3:
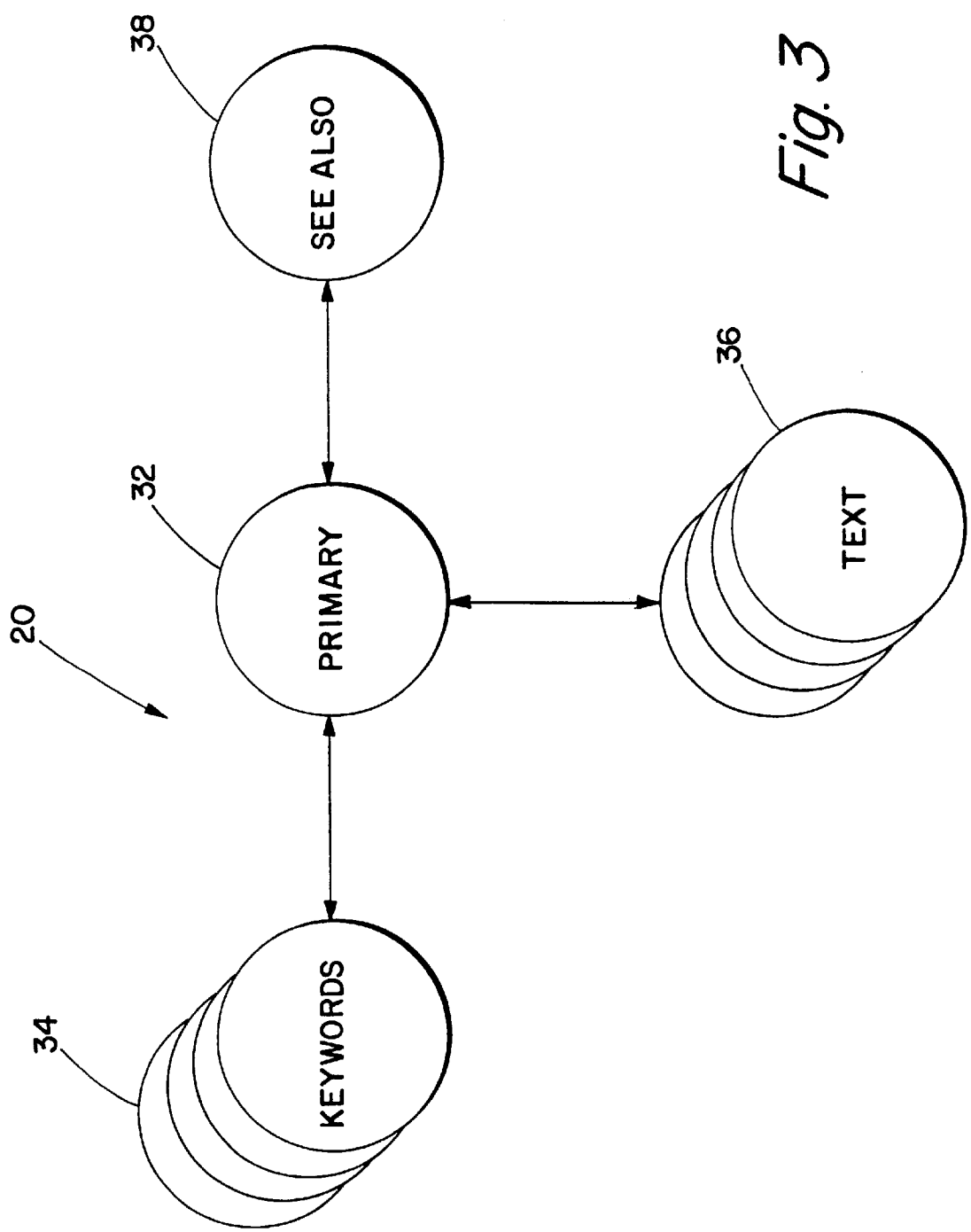
FIG. 3 is a schematic chart of an information repository of the present invention.

Referring to FIG. 3, the information repository 20 is shown in schematic form. The information repository 20 contains locator information that permits efficient and quick searches of available data sources and provides locator information which may be displayed to the user and/or utilized by the present invention to access data. Preferably, the information repository consists of 4 relational database tables. A primary database 32 may be used to store classification, identification, and statistical information pertaining to the object. The information stored by the primary database may contain the fields displayed in Table 1.

TABLE 1

| Key | Field Name | Contents | Format | Size |
|---|---|---|---|---|
| Yes | OIC | Object Instance Code - An arbitrarily assigned code to serve as a unique database key. | Numeric | 4 |
| Yes | Class | Primary Object Grouping | Alphanumeric | 4 |
| Yes | SubClass | Secondary Object Grouping | Alphanumeric | 4 |
|  | Identifier | URL based object identifier. A contrived may be created for internal products. | Alphanumeric | 255 |
|  | Rating | Ranking on scale from 1 to 10 with higher being better. Will not be available in all cases but could be used in conjunction with the Internet Yellow Pages. | Numeric |  |
|  | ValidDate | Date information was last known to be valid | Date |  |
|  | ExpireDate | Date information should be considered suspect and potentially deletable | Date |  |
|  | InvokeDate | Date object was last invoked | Date |  |
|  | MTD Count | Number of times invoked this month | Numeric | 4 |
|  | YTD Count | Number of times invoke this year | Numeric | 4 |
|  | SeeAlsoFlag | Indicates presence of data in the see also database for this object. | Boolean | 1 |

A sample listing of possible Class and SubClass identifiers for the Primary database is available in Table 2. Additional Class and SubClass identifiers may be used as necessary.

TABLE 2

| Class | SubClass | Refers to: |
|---|---|---|
| FRUM | FRUM | A Forum ® as a whole |
|  | MSGA | A Forum ® message area |
|  | LIBA | A Forum ® library area |
|  | FILE | A Forum ® library file |
| FTP | SITE | A FTP site as a whole |
|  | DIR | A directory at an FTP site |
|  | FILE | A file at an FTP site |

TABLE 2-continued

| Class | SubClass | Refers to: |
|---|---|---|
| TNET | SITE | A Telnet site as a whole |
|  | PRGM | An executable application at a Telnet site |
| HTTP | PAGE | a HTML page |
| MLST | LIST | An Internet mailing list |
| UNET | NGRP | A UseNet newsgroup |
| GOPH | MENU | A gopher menu |
| MALL | STOR | A store in the electronic mall |
|  | DEPT | A department within an electronic mall store |
| PAGE | ARTC | An article page |
|  | DAP | A DAP menu page |
|  | EM | An enhanced menu page |
| PSAP | PSAP | An executable program |
| DISP | TEXT | A displayable text file |
|  | GIF | A displayable GIF $^{SM}$ file |

The information repository 20 may also contain a keyword database 34. The keyword database may associate keywords with products by creating a many to many relationship with between keywords with primary or text tables. Separate keyword tables may be created to provide non-English language support for keyword lookup. Table 3 contains possible fields for use in a keyword database.

TABLE 3

| Key | Field Name | Contents | Format | Size |
|---|---|---|---|---|
| Yes | OIC | Object Instance Code - an arbitrarily assigned identification code | Numeric | 4 |
| Yes | KeyWord | Keyword which pertains to the object associated with OIC. | Alphanumeric | 16 |

The information repository 20 may also contain a text database 36. The text database may exist in a one to one relationship with the primary table and may be used to isolate text descriptions from the primary table so that multiple language support may be provided, if desired, by using multiple instances of the text table. Table 4 contains example fields for a text database of the present invention.

TABLE 4

| Key | Field Name | Contents | Format | Size |
|---|---|---|---|---|
| Yes | OIC | Object Instance Code - an arbitrarily assigned identification code | Numeric | 4 |
|  | Title | Object name of title for display in selection list box. In mixed case for display. | Alphanumeric | 50 |
|  | Description | Description of the object. In mixed case for display | Alphanumeric | 512 |
|  | UpTitle | Title in all uppercase for searching. | Alphanumeric | 50 |
|  | UpDesc | Description in all uppercase for searching. | Alphanumeric | 512 |

The information repository of the present invention may also contain a See Also database 38. The See Also database may be used to establish a many to many relationship between a particular primary table entry and other primary table entries. Using the method one entry can reference another for such purposes as linking FTP sites to their mirror sides or establishing a connection to a disclaimer. The See Also table may also be used to link two entries which are related in some manner. Table 5 shows some possible fields for the See Also database. Possible Category codes for the See Also table of the present invention are listed in Table 6.

TABLE 5

| Key | Field Name | Contents | Format | Size |
|---|---|---|---|---|
| Yes | OIC | Object Instance Code - An arbitrarily assigned identification code. | Numeric | 1 |
|  | RefOIC | OIC code for the object being referenced as a "see also" | Numeric | 1 |
|  | Category | See Also Category Code | Alphanumeric | 4 |

TABLE 6

| Category | Description |
|---|---|
| MIRR | FTP mirror site reference |
| ALTN | Alternate access method |
| CITE | A citation source, copyright, etc. |
| DCLM | A disclaimer |
| ADVT | Advertising |
| ALSO | An item related in some unspecified manner. A reference to a shareware game might have an ALSO link to the Association of Shareware Professionals Forum. |

The present invention has been described in the form of preferred embodiments, but it is to be recognized that several modifications and variations to the invention could be made and fall within the scope of the subjoined claims.

What is claimed is:

1. A method for retrieving data from a plurality of sources, comprising the steps of:
   (a) defining a plurality of information source objects identifying proprietary data sources and Internet data sources;
   (b) obtaining a search request from a computer user;
   (c) displaying a list of propriety data sources and Internet data sources responsive to said request, said list created in accordance with said information source objects;
   (d) selecting at least one of said proprietary data sources or said Internet data sources responsive to said request;
   (e) retrieving data from said selected data source; and
   (f) displaying said retrieved data.

2. The method of claim 1 wherein the step of defining information source objects comprises the step of defining class, description, location, and retrieval information for said information source objects.

3. The method of claim 1 wherein the step of selecting at least one of said proprietary data sources comprises the step of selecting an information service data source from the group consisting of forums, forum message areas, forum library areas, forum library files, electronic mall stores, electronic mall departments, article pages, menu pages, executable programs, text files, and graphic files.

4. The method of claim 1 wherein the step of selecting at least one of said Internet data sources comprises the step of selecting a data source from the group consisting of file transfer protocol sites, file transfer protocol directories, file transfer protocol files, telnet sites, telnet programs, hypertext transfer protocol pages, mailing lists, usenet newsgroups, and gopher menus.

5. The method of claim 1 further comprising the step of updating said information source objects in accordance with update mechanisms for each of said information source objects.

6. The method of claim 1 further comprising the step of updating said information source objects interactively.

7. The method of claim 1 wherein the step of retrieving data from said selected data source comprises the step of launching a client to access said selected data source.

8. A system for retrieving data from a plurality of sources comprising:
   a plurality of information source objects identifying proprietary data sources and Internet data sources;
   a search engine for searching said plurality of information source objects and formulating a list of information source objects responsive to a search request; and
   an interactive front end for formulating said search request and displaying data retrieved in accordance with at least one information source object in said list.

9. The system of claim 8 wherein said information source objects comprise an identifier, a description, and universal resource locator information.

10. The system of claim 8 further comprising an information repository for storing said plurality of information source objects.

11. The system of claim 8 wherein said interactive front-end allows a user to identify which of said plurality of information source objects to search.

12. The system of claim 8 wherein said interactive front-end is selected from the group consisting of web browsers and dedicated interactive front-ends.

13. The system of claim 8 further comprising a launcher for retrieving said data from said at least one information source object in said list.

14. The system of claim 8 wherein said proprietary data sources comprise information service data sources from the group consisting of forums, forum message areas, forum library areas, forum library files, electronic mall stores, electronic mall departments, article pages, menu pages, executable programs, text files, and graphic files.

15. The system of claim 8 wherein said Internet data sources comprise data sources from the group consisting of file transfer protocol sites, file transfer protocol directories, file transfer protocol files, telnet sites, telnet programs, hypertext transfer protocol pages, mailing lists, usenet newsgroups, and gopher menus.

16. The system of claim 8 further comprising update mechanisms for each of said plurality of information source objects identifying proprietary data sources and Internet data sources.

17. The system of claim 16 wherein said update mechanisms are selected from the group consisting of interactive update mechanisms and background update mechanisms.

18. A method for creating an information repository comprising the steps of:

(a) defining identification, location, and retrieval information for a plurality of proprietary data sources;

(b) storing said identification, location, and retrieval information for said plurality of proprietary data sources in said information repository;

(c) defining identification, location, and retrieval information for a plurality of Internet data sources; and (d) storing said identification, location, and retrieval information for said plurality of Internet data sources in said information repository.

19. The method of claim 18 wherein the step of defining identification, location, and retrieval information comprises the steps of:

defining class identifiers;

defining subclass identifiers;

defining keywords;

defining descriptions; and defining data for use in locating and accessing said data source.

20. The method of claim 18 further comprising the steps of defining and storing in said information repository quality information for said proprietary data sources; and defining and storing in said information repository qualify information for said Internet data sources.

* * * * *